W. A. SMITH.
METHOD OF TREATING CARBON.
APPLICATION FILED APR. 20, 1911.
1,032,246.
Patented July 9, 1912.
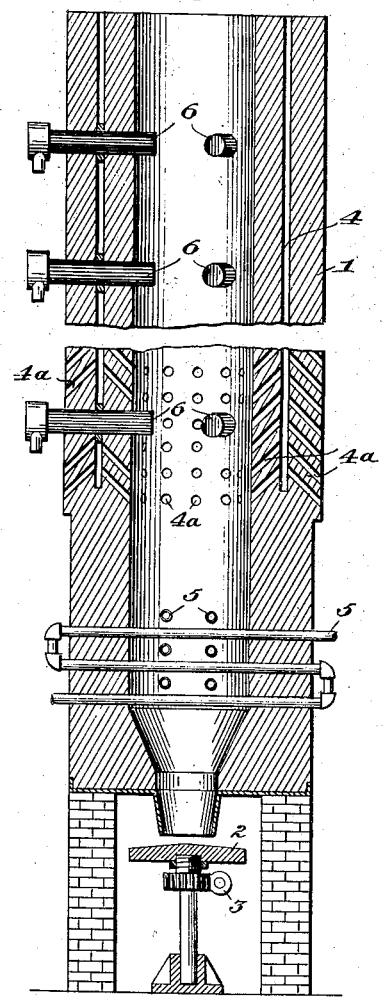
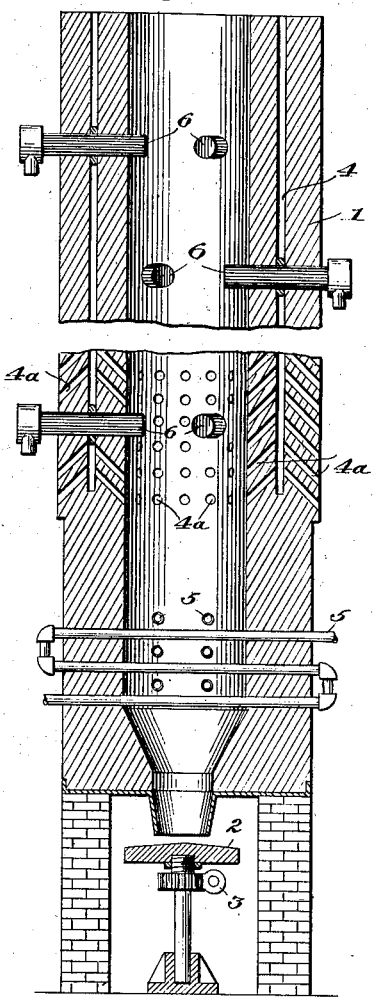
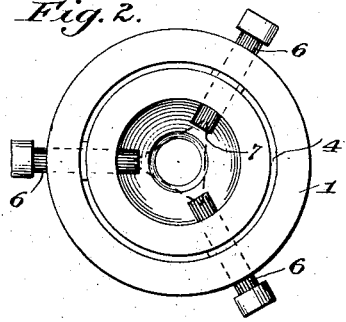
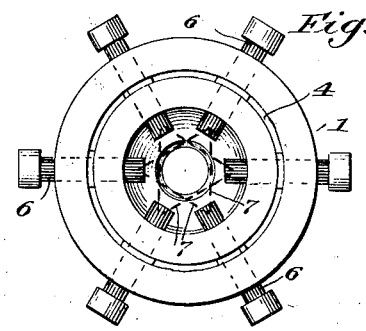
Witnesses:
N. P. Leonard,
R. I. Hulsizer.
Inventor:
William Acheson Smith,
by Byrnes Townsend & Breckenstein,
Att'ys

UNITED STATES PATENT OFFICE.

WILLIAM ACHESON SMITH, OF NIAGARA FALLS, NEW YORK, ASSIGNOR TO INTERNATIONAL ACHESON GRAPHITE COMPANY, OF NIAGARA FALLS, NEW YORK.

METHOD OF TREATING CARBON.

1,032,246. Specification of Letters Patent. Patented July 9, 1912.

Application filed April 20, 1911. Serial No. 622,333.

*To all whom it may concern:*

Be it known that I, WILLIAM ACHESON SMITH, a citizen of the United States, residing at Niagara Falls, in the county of Niagara and State of New York, have invented certain new and useful Improvements in Methods of Treating Carbon, of which the following is a specification.

This invention relates to methods of treating carbon or carbonaceous material for the purpose of converting it in a progressive or substantially continuous manner into a homogeneous, uniform, commercial product.

As is well known, such commercial forms of carbon as petroleum coke, gas coke, anthracite coal and the like undergo when heated a series of successive modifications, dependent not only upon the temperature to which they are heated but upon the duration of the heat treatment, without however undergoing any marked change of bulk such as is characteristic of most metallurgical or reducing operations. For example, moderate heating, or heating for a brief period to a high temperature, results in the expulsion of the volatile hydrocarbons; by longer heating at sufficient temperatures the less volatile impurities are driven off, and the carbon undergoes a progressive increase in density and electrical conductivity and becomes polymerized, and may under proper conditions be converted ultimately into graphite.

As between the several forms of carbon which may result from the application of heat to commercial carbonaceous materials, no mechanical separation is practicable, and it is essential in order that a given raw material may be converted throughout its mass into a commercial product of the desired character that the conditions as regards time and temperature of heating should be susceptible of accurate control and close adjustment, and that the heat should be so applied as to result in a practically uniform treatment of all particles traversing the furnace.

According to the present invention the body of carbon or carbonaceous material to be treated is moved progressively through a heating zone located between terminals connected to a source of polyphase current, usually but not necessarily a triphase current, the arrangement of the terminals and the construction of the furnace being such as to secure a practically uniform heating of the entire cross section of the charge. One or more heating zones may be provided according to the results desired.

For a full understanding of the invention reference is made to the accompanying drawing illustrating certain preferred forms of furnace.

In said drawing—Figure 1 is a central vertical section of one form of furnace for carrying out the invention; Fig. 2 is a plan view thereof; Fig. 3 is a central vertical section of a modified form of furnace; and Fig. 4 is a plan view of the construction of Fig. 3.

In said drawings, 1 represents the wall of a furnace of the vertical shaft type, having a bottom discharge mechanism comprising a horizontal disk or slightly coned hearth 2, mounted for slow rotation by means of a worm gear 3, and adjustable relatively to the base of the furnace so that the material is discharged over the periphery of the hearth only while the same is being rotated.

4 indicates a space in the furnace walls adjacent the heating zone, this space communicating by inclined apertures 4ª both with the heating chamber and the external air, in order that the furnace gases may readily escape from the heating zone, and that a mantle of such gases may be burned within the furnace walls to economize heat and to equalize the interior heating effect.

5 indicates cooling means, represented as a system of water pipes disposed in the path of the charge between the heating zone and the discharge hearth.

In the construction shown in Figs. 1 and 2 there are indicated three vertically spaced groups of electrodes 6, each group comprising three electrodes, usually of carbon or graphite disposed radially in the walls of the furnace at points 120° apart. These electrodes are in practice connected to the terminals of a three-phase circuit, or independent three-phase circuits, in such manner that the zone of high temperature is developed in the charge in the horizontal plane of the respective groups. Any desired number of electrode groups may be provided, so spaced with regard to each other and with reference to the downward movement of the charge that the high temperature of the carbon is maintained or progressively augmented during its downward progress.

The combustion of the evolved gases in the chamber 4 insures the maintenance of high temperatures in that portion of the charge adjacent the inner walls of the shaft, and aids in securing a practically even temperature throughout a given horizontal cross section of the charge. In its downward progress below the heating zone of the furnace, the charge passes through a cooling zone provided by the transverse pipes 5, and is thereby cooled to such degree that it may be delivered from the rotary hearth 2 below its combustion temperature.

In the construction shown in Figs. 1 and 2 the electrodes of the several groups are vertically alined, and the path of the current, assuming the winding of the generator to be of the delta type, is as represented by the dotted lines in Fig. 2. In the construction of Figs. 3 and 4 the members of the superposed electrode groups are shown as placed out of vertical alinement, whereby a somewhat more even electrical heating effect may be secured, the current paths being as indicated in Fig. 4 by the dotted lines 7. In the employment of polyphase currents other than triphase, the number and arrangement of the electrodes will be correspondingly altered, as is well understood in the art.

I claim:—

1. The method of treating carbon to prepare therefrom a commercially uniform product, which consists in passing an electric current through a body of carbonaceous material between terminals connected to a source of polyphase current, and advancing said body in a direction substantially transverse to the lines of current flow.

2. The method of treating carbon to prepare therefrom a commercially uniform product, which consists in passing an electric current through a body of carbonaceous material between terminals connected to a source of polyphase current, advancing said body in a direction substantially transverse to the lines of current flow, and burning evolved gases around said body.

3. The method of treating carbon to prepare therefrom a commercially uniform product, which consists in passing an electric current through a body of carbonaceous material between terminals connected to a source of polyphase current, advancing said body in a direction substantially transverse to the lines of current flow, and thereafter cooling the charge below its temperature of combustion in air.

4. The method of treating carbon to prepare therefrom a commercially uniform product, which consists in passing an electric current through a body of carbonaceous material between terminals connected to a source of polyphase current, advancing said body in a direction substantially transverse to the lines of current flow, burning evolved gases around said body, and thereafter cooling the charge below its temperature of combustion in air.

In testimony whereof, I affix my signature in presence of two witnesses.

WILLIAM ACHESON SMITH.

Witnesses:
FRANK N. COE,
WM. H. ARISON.